US010332240B2

(12) United States Patent
Sun et al.

(10) Patent No.: US 10,332,240 B2
(45) Date of Patent: Jun. 25, 2019

(54) METHOD, DEVICE AND COMPUTER READABLE MEDIUM FOR CREATING MOTION BLUR EFFECT

(71) Applicant: Tencent Technology (Shenzhen) Company Limited, Shenzhen, Guangdong (CN)

(72) Inventors: Hui Sun, Shenzhen (CN); Peng Xue, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 0 days.

(21) Appl. No.: 15/787,503

(22) Filed: Oct. 18, 2017

(65) Prior Publication Data
US 2018/0040106 A1  Feb. 8, 2018

Related U.S. Application Data

(63) Continuation of application No. PCT/CN2016/079647, filed on Apr. 19, 2016.

(30) Foreign Application Priority Data

Apr. 29, 2015  (CN) .......................... 2015 1 0212217

(51) Int. Cl.
*G06T 5/00* (2006.01)
*G06T 13/00* (2011.01)
*G06T 13/20* (2011.01)

(52) U.S. Cl.
CPC .............. *G06T 5/002* (2013.01); *G06T 13/00* (2013.01); *G06T 13/20* (2013.01); *G06T 2207/20172* (2013.01); *G06T 2210/62* (2013.01)

(58) Field of Classification Search
USPC ....................................................... 345/581
See application file for complete search history.

(56) References Cited

U.S. PATENT DOCUMENTS

2008/0079718 A1   4/2008  Woo
2008/0218515 A1*  9/2008  Fukushima ........... G06T 19/006
                                                   345/424

(Continued)

FOREIGN PATENT DOCUMENTS

CN    101025828        8/2007
CN    101154294 A      4/2008

(Continued)

OTHER PUBLICATIONS

International Search Report in PCT Application No. PCT/CN2016/079647, dated Jul. 1, 2016 in 3 pages.

(Continued)

*Primary Examiner* — Wesner Sajous
(74) *Attorney, Agent, or Firm* — Knobbe Martens Olson & Bear LLP

(57) ABSTRACT

A method, device and non-transitory computer readable medium for presenting an afterimage are provided. In some embodiments, the method includes: determining a target object, wherein the target object is an image element, an afterimage of which is to be presented; obtaining a motion track of the target object; replicating the target object to obtain the preset number of replicated objects; arranging, according to the motion track of the target object, the target object and the replicated objects; setting transparencies of the replicated objects, wherein a transparency of a replicated object spaced from the target object by a first distance is larger than a transparency of a replicated object spaced from (Continued)

the target object by a second distance; and displaying, on the display device, the target object and the replicated objects with the set transparencies.

20 Claims, 7 Drawing Sheets

(56) References Cited

U.S. PATENT DOCUMENTS

2010/0302242 A1    12/2010  Buchanan et al.
2011/0090343 A1*   4/2011   Alt ..................... G06T 19/006
                                                              348/164
2014/0111524 A1    4/2014   Li et al.

FOREIGN PATENT DOCUMENTS

| CN | 102724418   | 10/2012 |
| CN | 103021007   | 4/2013  |
| CN | 104766361   | 7/2015  |
| JP | 2001-243499 | 9/2001  |
| JP | 2001-276415 | 10/2001 |

OTHER PUBLICATIONS

Office Action with Translation Issued in Chinese Application No. 201510212217.3 dated Oct. 10, 2017, 26 pages.

* cited by examiner

METHOD, DEVICE AND COMPUTER READABLE MEDIUM FOR CREATING MOTION BLUR EFFECT

The present application is a continuation of International Application No. PCT/CN2016/079647, filed on Apr. 19, 2016, which claims the priority to Chinese Patent Application No. 201510212217.3, titled "METHOD, DEVICE AND COMPUTER READABLE MEDIUM FOR CREATING MOTION BLUR EFFECT", filed on Apr. 29, 2015 with the State Intellectual Property Office of the People's Republic of China, both of which are incorporated herein by reference in their entireties.

TECHNICAL FIELD

The present disclosure relates to the field of computer technology, and particularly to a method, apparatus and computer readable medium for presenting an afterimage.

BACKGROUND

Afterimage is a series of virtual images of an object on a motion path thereof, which is used to present a high speed motion of the object in a movie or a video game.

A method for presenting an afterimage in the existing technology includes the following steps:

reserving a previous rendered image frame in a rendering buffer in a manner of closing a rendering clearing function; and then performing a transparency and blending process on a new image frame and the reserved image frame to overlap the new image frame with the reserved image frame, to implement an afterimage effect in a visual.

In order to better illustrate the above method, as shown in FIG. 1, multiple image frames are shown on the left. Among them, the top three ones are the reserved frames reserved in the rendering buffer. The bottom one is a current frame which is a currently drawn image frame. The middle of the FIG. 1 is a schematic diagram of a transparency blending process on the four image frames (the reserved frames are overlapped with the current frame). The right of the FIG. 1 shows an afterimage effect in a visual. In order to implement the afterimage effect, the longer the time for reserving the image, the more transparent the image.

SUMMARY

A method, apparatus and computer readable medium for presenting an afterimage is provided in embodiments of the disclosure, to reduce a data processing resource and a storage resource used to present the afterimage and lower a requirement of hardware in order to obtain a smooth visual effect.

In some embodiments, a method for presenting an afterimage is applied to a terminal including a display device. The method includes:

determining a target object, wherein the target object is an image element, an afterimage of which is to be presented;

obtaining a motion track of the target object;

replicating the target object to obtain the preset number of replicated objects;

arranging, according to the motion track of the target object, the target object and the replicated objects;

setting transparencies of the replicated objects, wherein a transparency of a replicated object spaced from the target object by a first distance is larger than a transparency of a replicated object spaced from the target object by a second distance; and displaying, on the display device, the target object and the replicated objects with the set transparencies.

In some embodiments, an apparatus for presenting an afterimage, applied to a terminal, includes:

a target determining unit, configured to determine a target object, wherein the target object is an image element, an afterimage of which is to be presented;

a track obtaining unit, configured to obtain a motion track of the target object;

a replicating unit, configured to replicate the target object to obtain the preset number of replicated objects;

an arranging unit, configured to arrange, according to the motion track of the target object, the target object and the replicated objects;

a setting unit, configured to set transparencies of the replicated objects, wherein a transparency of a replicated object spaced from the target object by a first distance is larger than a transparency of a replicated object spaced from the target object by a second distance; and a display unit, configured to display, on the display device, the target object and the replicated objects with the set transparencies.

In some embodiments, a computer readable medium, used to store one or more computer programs, wherein the computer program includes an instruction executed by a computer system with one or more storages. The computer system executes the instruction to:

determine a target object, wherein the target object is an image element, an afterimage of which is to be presented;

obtain a motion track of the target object;

replicate the target object to obtain the preset number of replicated objects;

arrange, according to the motion track of the target object, the target object and the replicated objects;

set transparencies of the replicated objects, wherein a transparency of a replicated object spaced from the target object by a first distance is larger than a transparency of a replicated object spaced from the target object by a second distance; and display, on the display device, the target object and the replicated objects with the set transparencies.

From the above technical solutions, the embodiments of the disclosure have the following advantages. An afterimage may be presented after the target object and the replicated objects are displayed. The above process for presenting the afterimage only needs to replicate the image element for generating the afterimage effect, arrange the images and set the transparencies. Thus, the whole image frame does not need to be stored in the rendering buffer and the transparency blending process does not need to be performed on the whole image frame. In this way, the data processing resource and the storage resource for implementing the afterimage effect can be reduced, the requirement of the hardware is lowered, so to obtain the smooth visual effect.

BRIEF DESCRIPTION OF THE DRAWINGS

In order to clearly describe the embodiments of the present disclosure, the drawings to be used in the description of the embodiments are described briefly as follows. The drawings in the following description only show some embodiments of the disclosure. It will be apparent to those

DETAILED DESCRIPTION OF EMBODIMENTS

Figure 1:
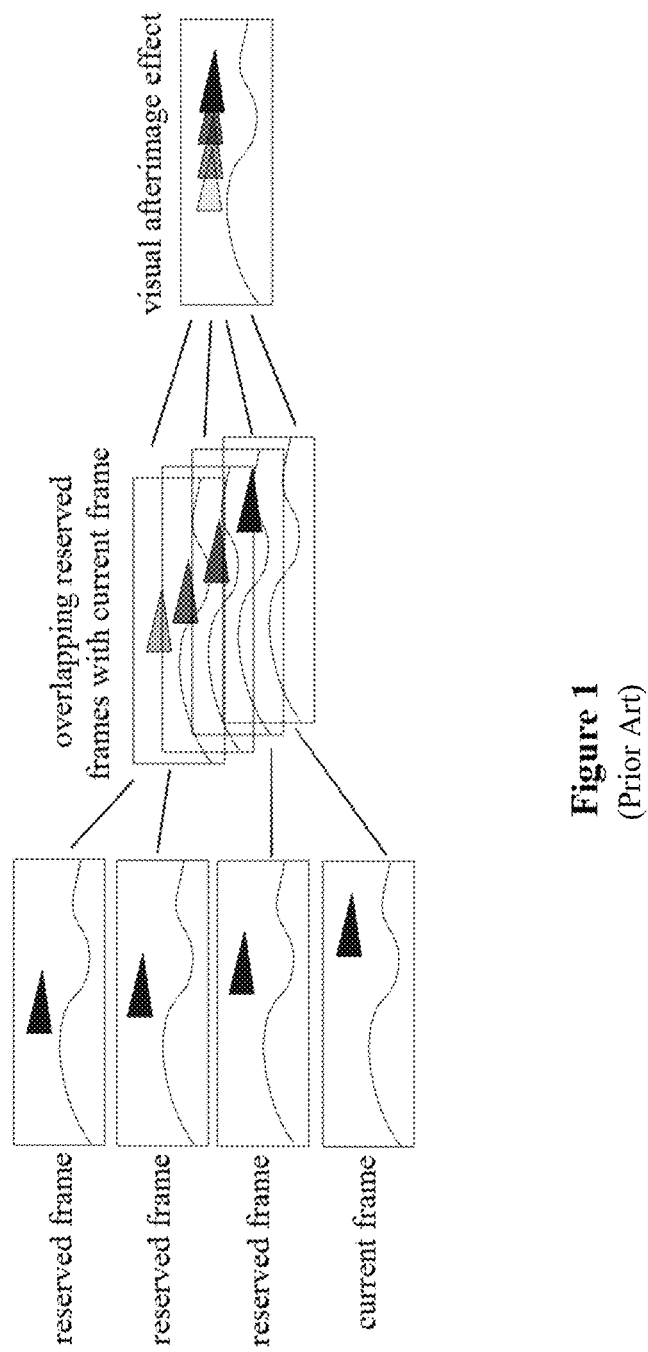
FIG. 1 is a schematic diagram of an image rendering in the conventional technology.
Figure 2:
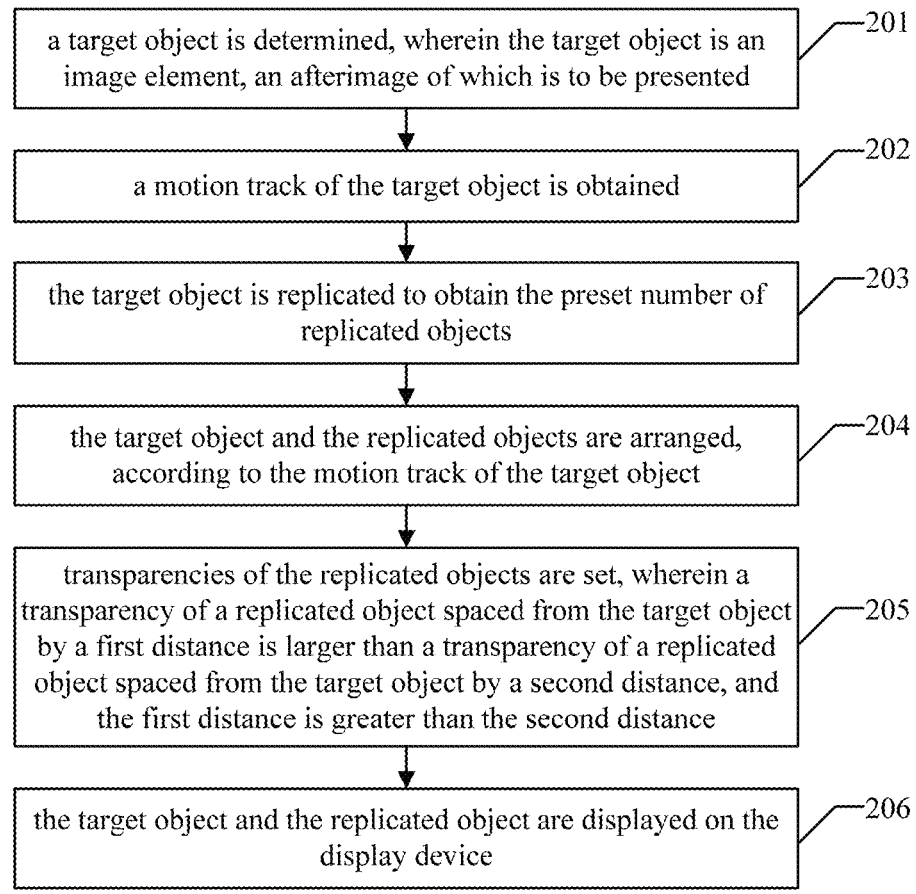
FIG. 2 is a flow chart of a method according to an embodiment of the disclosure.

In order to clarify the objective, the technical solutions and the advantages of the disclosure, the disclosure are described clearly and completely in conjunction with the drawings hereinafter. It is apparent that the described embodiments are only a few rather than all of the embodiments of the disclosure. Any other embodiments obtained by those skilled in the art based on the embodiments in the present disclosure fall within the scope of the present disclosure.

A method for presenting an afterimage is applied to a terminal including a display device. The method includes the following steps.

201: A target object is determined. The target object is an image element, an afterimage of which is to be presented.

In the embodiment of the disclosure, the target object may be any image element needed to present an afterimage effect, for example, a movable image element such as a character role or an object in an animation. Generally, a static object, for example a background image, a flower, a grass, a tree and a stone on a map and so on, does not need to present the afterimage. In the embodiment, an animation character may be a movable image element such as a three dimensional (3D) animation character role or object, or may be a movable image element such as a two dimensional (2D) character role or object. The technical solutions in the embodiments of the disclosure may all be effectively applied to the 3D and 2D animation characters, which is not limited in the embodiment of the disclosure.

202: A motion track of the target object is obtained.

A moving image element has a motion track. The motion track may include information such as a moving direction and a state of an object itself. For example, a linear or curvilinear motion of the image element may have a path that a motion passes through; and a rotation of the image element may change a state of a visual angle of the image element.

203: The target object is replicated to obtain the preset number of replicated objects.

In the embodiment, the number of replicated objects may be determined according to a requirement. Generally, the number of replicated objects is larger than or equal to two. The afterimage effect is poor in a situation of only one replicated object.

204: The target object and the replicated objects are arranged according to the motion track of the target object.

205: Transparencies of the replicated objects are set. A transparency of a replicated object spaced from the target object by a first distance is larger than a transparency of a replicated object spaced from the target object by a second distance, and the first distance is greater than the second distance.

In the embodiment, each of the first and second distances may be a spatial distance or a time distance. In a linear motion, the first and second distances may be the spatial distances. If each of the first and second distances is the time distance, the time distance may be a difference between a time corresponding to the replicated object in a motion track and a time corresponding to the target object. Instead of the time corresponding to the target object, any other time after time corresponding to the first replicated object may be used as a reference, which is not limited in the embodiment of the disclosure.

206: The target object and the replicated objects are displayed on the display device with the set transparencies.

In the embodiment, the afterimage may be presented after the target object and the replicated objects are displayed. The above process for presenting the afterimage only needs to replicate the image element for generating the afterimage effect, arrange the images and set the transparencies. Thus, the whole image frame does not need to be stored in a rendering buffer and the transparency blending process does not need to be performed on the whole image frame. In this way, a data processing resource and a storage resource for implementing the afterimage effect can be reduced, a requirement of hardware is lowered, so to obtain a smooth visual effect.

In an embodiment of the disclosure, a method for presenting an afterimage may be applied in any application scenario needing to present the afterimage, such as a video and a game for appearing images. The application scenario may be for example a video generating process in a movie production process, an animation generating process of a 2D or 3D game and so on. A particular application scenario may be correspondingly determined according to an application requirement of the afterimage effect, which is not limited in the embodiment of the disclosure. For a three-dimensional picture, a preferable implementation is provided according to an embodiment of the disclosure as follows. The above target object is a 3D target object. The step of replicating the target object to obtain the preset number of replicated objects includes:

replicating a grid of the target object to obtain the preset number of grids of the replicated objects; and determining that the grids of the replicated objects have the same material as the grid of the target object.

In the embodiment, for a 3D image element, only the grid is replicated. There is no need to replicate all information of the image element, and thus an amount of replicated data and a space to be occupied are reduced. A grid in a 3D rendering represents a profile of a 3D object, i.e., a profile of the above image element. A material in a 3D rendering represents surface information of a 3D object, which includes a color, a pattern and so on. The material is attached on a surface of the grid, to make the grid present a real effect of the 3D object.

Based on the embodiment of the disclosure applying in a 3D application scenario, a preferable implementation for setting a transparency is further provided according to an embodiment of the disclosure as follows. The step of setting transparencies of replicated objects includes: adjusting transparencies of vertexes in the respective grids of the replicated objects.

In the embodiment, the motion track of the target object may be obtained by many manners and then the replicated objects are arranged. In a preferable embodiment of the disclosure, the step of obtaining the motion track of the target object includes:

recording motion information of the target object at a preset time interval.

Correspondingly, the step of arranging the target object and the replicated objects according to the motion track of the target object includes: arranging the replicated objects to positions corresponding to the recoded motion information successively.

In the embodiment, instead of a motion track of the target object, only the motion information of the target object needs to be obtained, so as to determine information such as a position and an angle of each replicated object, so to efficiently implement a position and an angle of the afterimage. The preset time interval may be a fixed value or a variable value changing with a control parameter. For example, the faster a moving speed is, the larger the distance between the afterimages is. However, a large distance may lower an effect of the afterimage. Thus, in the case of a fast moving speed, a time interval between the replicated objects may be shortened. Criteria shortening the time interval may be set as making a distance between two adjacent replicated objects less than a preset value. The preset value may be set according to a size of the target object. The bigger the size of the target object is, the larger the preset value is.

Optionally, in the embodiment, the motion information may only include position information. In another embodiment, for many rotating objects, the motion information may include rotation information. A position change and an angle change caused by rotating are all caused by moving, and thus they are all called motion information. In particular, the motion information may include at least one of the rotation information and the position information.

Furthermore, an acceleration and deceleration of the moving speed of an object may be shown by adding or reducing the number of the replicated objects in an embodiment. Before replicating the target object to obtain the preset number of replicated objects, the above method further includes:

determining a moving speed of the target object; and
determining the replicated number of the target object according to the moving speed. The replicating number of the target object in the case of the fast moving speed is more than that in the case of the slow moving speed.

Based on an embodiment of the disclosure, a game image display implemented at a terminal is used as an application scenario. In particular, the determining a target object includes:

determining an object currently operated by a user in an image displayed on the display device of the terminal, as the target object.

Figure 9:
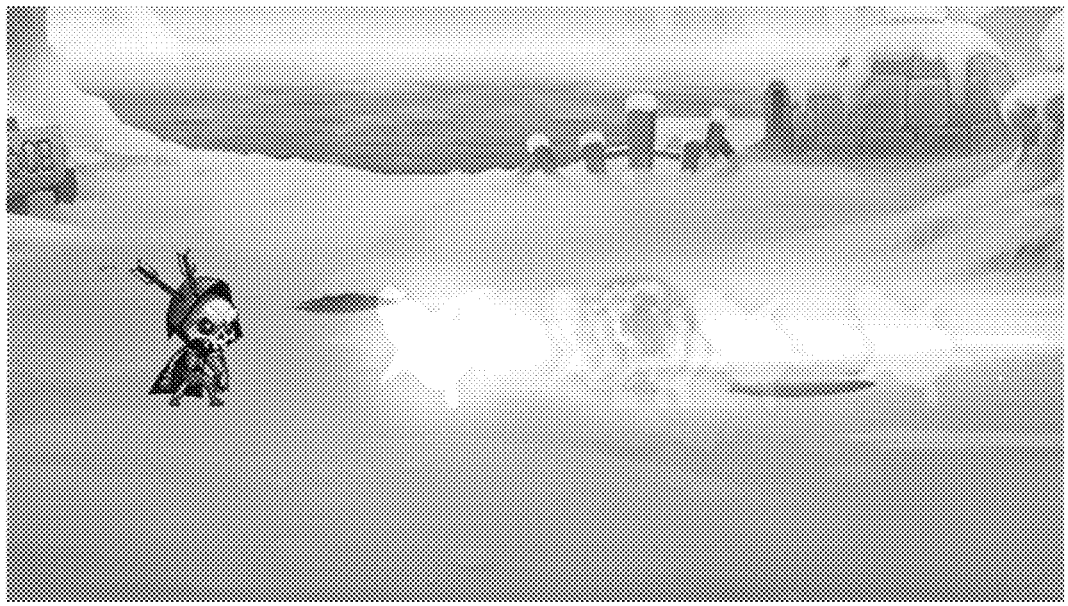
FIG. 9 is an effect diagram of an afterimage in a 3D game according to an embodiment of the disclosure.

The object operated by the user may be a character object in a 2D game picture or a character object in a 3D game picture. A particular type of a game is determined according to a client device, on which the afterimage to be presented. In FIG. 9, a mobile phone game of Penguin Warriors is taken as an example.

The following embodiment takes a 3D game picture of a mobile terminal as an example to illustrate. Firstly, relating technical terms are introduced.

Afterimage: a series of virtual images on a motion path of an object in order to present a high speed motion of the object in a movie or a video game.

Rendering buffer: a cache for storing drawn contents in a 3D rendering. After all drawings are implemented, the contents in the rendering buffer are displayed on a screen.

Render clearing: in a 3D rendering, an operation for clearing a rendering buffer.

Transparency blending: in a 3D rendering, two images with transparent elements being overlapped and combined to one image. In a visual effect, the content of the image on the lower layer may be seen right through the image on the upper layer.

Image frame: in a 3D rendering, an image being displayed on a screen every time. Every image is a frame. Generally 30 to 60 images are drawn on a screen per second in a 3D animation to generate an animation effect.

Grid: representing a profile of a 3D object in a 3D rendering.

Material: in a 3D rendering, representing surface information of a 3D object, including a color, a pattern and so on, which is attached on a surface of the grid to make the grid present a real effect of the 3D object.

An afterimage is often used at an application of a mobile terminal to present a better visual experience. The afterimage effect may be mainly implemented by the transparency blending technology in the background technology. The transparency blending has a high requirement of hardware performance, and thus the 3D afterimage effect is difficult to be smoothly run on a mobile device with a low configuration. In the embodiment of the disclosure, a method is provided to smoothly present the 3D afterimage on the mobile device with the low configuration in a high efficiency. In the embodiment, the grid of the 3D object is replicated and a moving rule of the replicated grids is controlled to achieve the afterimage. Particular steps are as follows.

1, A grid of the 3D object, an afterimage of which is to be presented, is replicated to obtain multiple replicated grids of the 3D object.

Figure 3:
FIG. 3 is a schematic diagram of an image replicating result according to an embodiment of the disclosure.

As shown in FIG. 3, it is assumed that a triangle represents a 3D object in the left of FIG. 3. The 3D object is replicated three times. Thus, three replicated objects and one original object are shown in the right of FIG. 3. In an embodiment, the number of replicated grids is determined based on the required number of afterimages. Instead of other information, only the grid is replicated. In this way, a memory space is saved.

Figure 4:
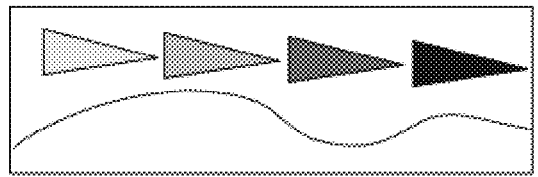
FIG. 4 is a schematic diagram of a transparency setting result according to an embodiment of the disclosure.

2, The replicated grids all adopt a material of the original 3D object to save the memory. A transparency of a color of a vertex in each replicated grid is adjusted to achieve a translucent afterimage effect. As shown in FIG. 4, the higher the transparency is, the farther the distance to a position of the original 3D object is. The transparencies of the replicated objects are descending.

3, After the original 3D object begins to move, position information and rotation information of the original object is recorded. The position information and the rotation information are called by motion information.

Figure 5:
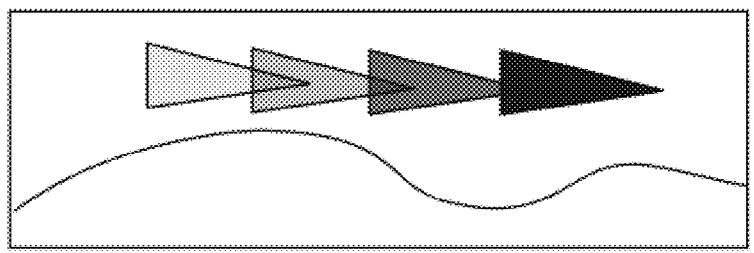
FIG. 5 is a schematic diagram of a linear motion result of an object according to an embodiment of the disclosure.
Figure 6:
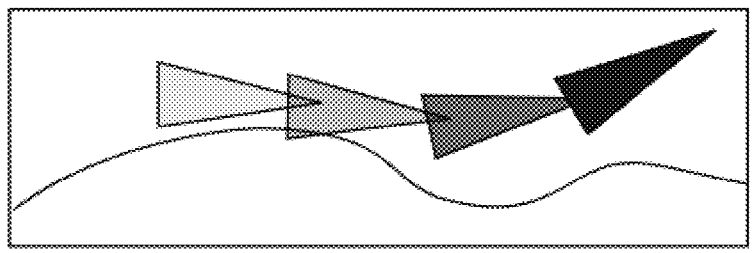
FIG. 6 is a schematic diagram of a result for moving and rotating an object according to an embodiment of the disclosure.

4, The motion information is recorded in a preset time interval, such as 0.5 second. For example, the motion information recorded after 0.5 second is applied to the first replicated grid, the motion information recorded after 1 second is applied to the second replicated grid and so on, to achieve an afterimage following effect. As shown in FIG. 5 and FIG. 6, FIG. 5 is a linear motion of an object and FIG. 6 is a shift and a rotation of an object.

Figure 7:
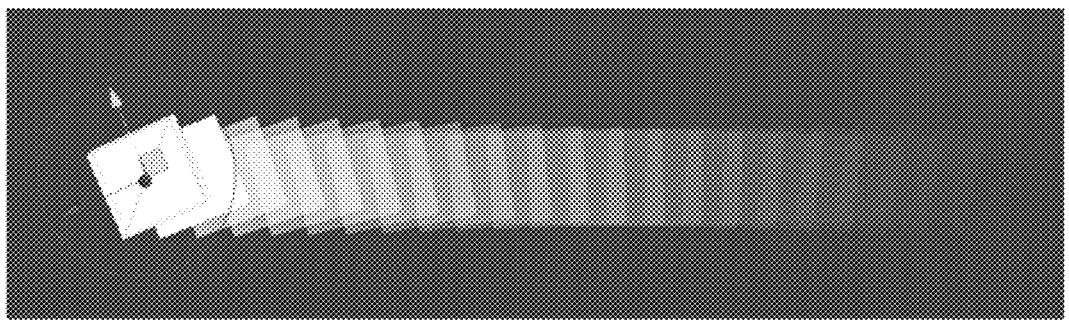
FIG. 7 is an effect diagram of an afterimage of an original 3D object of a moving front end according to an embodiment of the disclosure.
Figure 8:
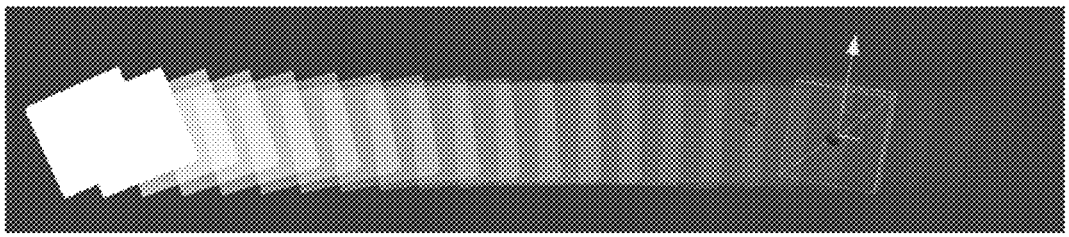
FIG. 8 is an effect diagram of a replicated grid following and an imitative motion according to an embodiment of the disclosure.

As shown in FIG. 7, it is an effect diagram of an original 3D object afterimage of a moving front end. FIG. 8 is an effect diagram of a replicated grid following and an imitative movement. FIG. 9 is an effect diagram of an afterimage in a 3D game.

Figure 10:
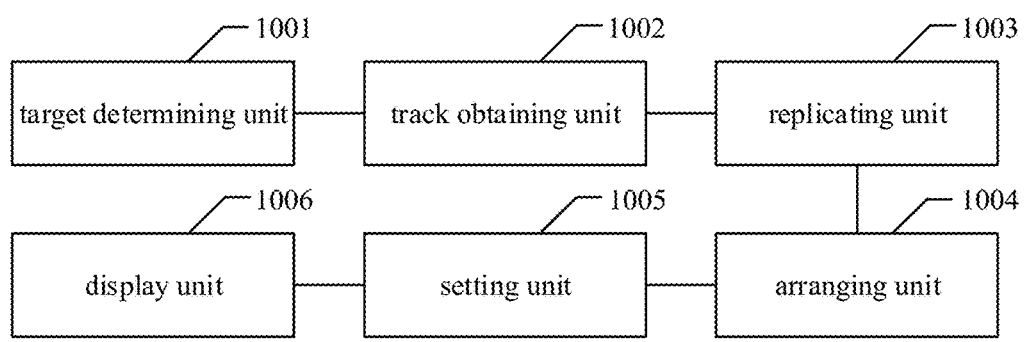
FIG. 10 is a schematic structural diagram of an apparatus according to an embodiment of the disclosure.

An apparatus for presenting an afterimage is further provided according to the embodiment of the disclosure, which applied to a terminal including a display device. As shown in FIG. 10, the apparatus includes:

a target determining unit 1001, configured to determine a target object, an afterimage of which is to be presented;

a track obtaining unit 1002, configured to obtain a motion track of the target object;

a replicating unit 1003, configured to replicate the target object to obtain the preset number of replicated objects;

an arranging unit 1004, configured to arrange, according to the motion track of the target object, the target object and the replicated objects;

a setting unit 1005, configured to set transparencies of the replicated objects, wherein a transparency of a replicated object spaced from the target object by a first distance is larger than a transparency of a replicated object spaced from the target object by a second distance, and the first distance is greater than the second distance; and a display unit 1006, configured to display, on the display device, the target object and the replicated objects with the set transparencies.

In the embodiment of the disclosure, the target object may be any image element needed to present an afterimage effect, for example, a movable image element such as a character role or an object in an animation. Generally, a static object, for example, a background image, a flower, a grass, a tree and a stone on a map and so on, does not need to present the afterimage.

In the embodiment, the number of replicated objects may be determined according to a requirement. Generally, the number of replicated objects is larger than or equal to two. The afterimage effect is poor in a situation of only one replicated object. A moving image element has a motion track. The motion track may include information such as a moving direction and a state of an object itself. For example, a linear or curvilinear motion of an image element may have a path that a motion passes through; and a rotation of the image element may change a state of a visual angle of the image element. Besides, a distance between the replicated object and the target object may be a spatial distance or a time distance. In a linear motion, the first and second distances may be the spatial distances. If each of the first and second distances is the time distance, the time distance may be a difference between time corresponding to the replicated object in a motion track and a time corresponding to the target object. Instead of the time corresponding to the target object, any other time after time corresponding to the first replicated object may be used as a reference, which is not limited in the embodiment of the disclosure.

In the embodiment, the afterimage may be presented after the target object and the replicated objects are displayed. The above process for presenting the afterimage only needs to replicate the image element for generating the afterimage effect, arrange the images and set the transparencies. Thus, the whole image frame does not need to be stored in a rendering buffer and the transparency blending process does not need to be performed on the whole image frame. In this way, a data processing resource and a storage resource for implementing the afterimage effect can be reduced, a requirement of hardware is lowered, so to obtain the smooth visual effect.

In an embodiment of the disclosure, a method for presenting an afterimage may be applied in any application scenario needing to present the afterimage such as a video and a game for appearing images. For a three-dimensional picture, a preferable implementation is provided according to an embodiment of the disclosure. In particular, the above target object is a 3D target object.

The replicating unit 1003 is configured to replicate a grid of the target object to obtain the preset number of grids of the replicated objects and determine that the grids of the replicated objects have the same material as the grid of the target object.

In the embodiment, for a 3D image element, only the grid is replicated. There is no need to replicate all information of the image element, and thus an amount of replicated data and a space to be occupied are reduced. A grid in a 3D rendering represents a profile of a 3D object, i.e., a profile of the image element. A material in a 3D rendering represents surface information of a 3D object, which includes a color, a pattern and so on. The material is attached on a surface of the grid, to make the grid present a real effect of the 3D object.

Based on the embodiment of the disclosure applying in a 3D application scenario, a preferable implementation for setting a transparency is further provided according to an embodiment of the disclosure as follows. The setting unit 1005 is configured to adjust transparencies of vertexes in the respective grids of replicated objects.

In the embodiment, the motion track of the target object may be obtained by many manners and then the replicated objects are arranged. A preferable solution is provided according to an embodiment of the disclosure as follows. The track obtaining unit 1002 is configured to record motion information of the target object at a preset time interval and the arranging unit 1004 is configured to arrange the replicated objects corresponding positions of the recoded motion information successively.

In the embodiment, instead of a motion track of the target object, only the motion information of the target object needs to be obtained to determine information such as a position and an angle of each replicated object, so to efficiently implement a position and an angle of the afterimage. The preset time interval may be a fixed value or a variable value changing with a control parameter. For example, the faster a moving speed is, the larger the distance between the afterimages is. However, a large distance may lower an effect of the afterimage. Thus, in the case of a fast moving speed, a time interval between the replicated objects may be shortened. Criteria shortening the time interval may be set as making a distance between two adjacent replicated objects less than a preset value. The preset value may be set according to a size of the target object. The bigger the size of the target object is, the larger the preset value is.

Optionally, in the embodiment, the motion information may only include position information. In another embodiment, for many rotating objects, the motion information may include rotation information. A position change and an angle change caused by rotating are all caused by moving, and thus they are all called motion information. In particular, the motion information may include at least one of the rotation information and the position information.

Figure 11:
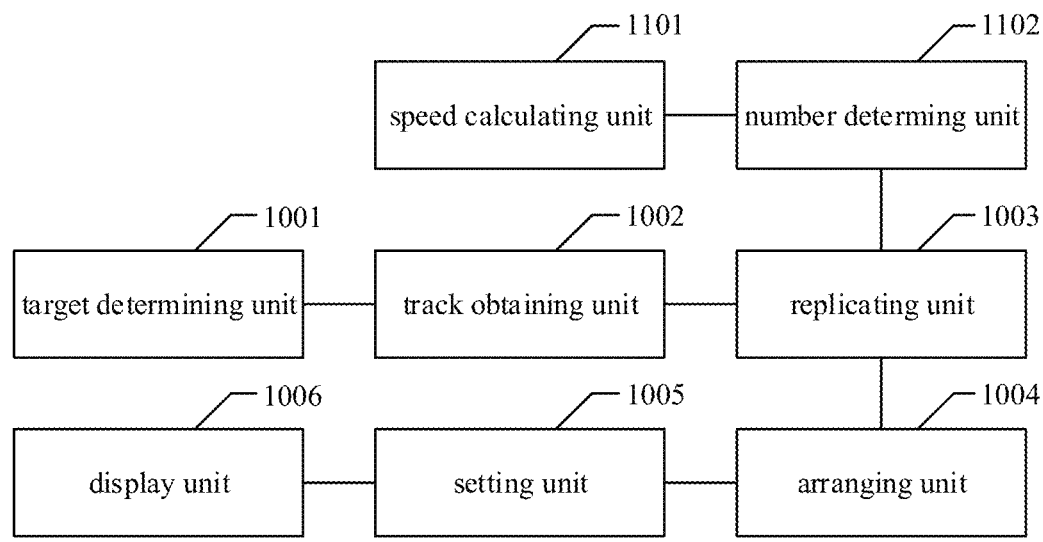
FIG. 11 is a schematic structural diagram of an apparatus according to an embodiment of the disclosure.

Furthermore, an acceleration and deceleration of the moving speed of an object may be shown by adding or reducing a number of the replicated objects as follows in an embodiment. As shown in FIG. 11, the apparatus further includes:

a speed calculating unit 1101, configured to determine a moving speed of the target object, before the replicating unit 1003 replicates the target object to obtain the preset number of replicated objects;

a number determining unit 1102, configured to determine the replicating number of the target object according to the moving speed, wherein the replicating number of the target object in the case of the fast moving speed is more than that in the case of the slow moving speed.

Based on an embodiment of the disclosure, a game image display implemented at a terminal is used as an application scenario. In particular, an apparatus for presenting an afterimage effect is a terminal.

The target determining unit 1001 is configured to determine an object currently operated by a user in an image displayed on a display device of the terminal, as the target object.

The object operated by the user may be a character object in a 2D game picture or a character object in a 3D game picture. A particular type of a game is determined according to a client device, on which the afterimage is to be presented. In FIG. 9, a mobile phone game of Penguin Warriors is taken as an example.

Figure 12:
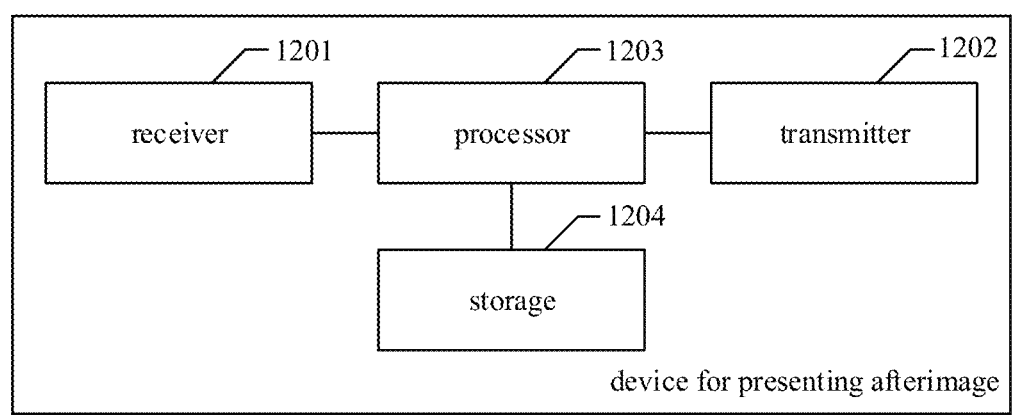
FIG. 12 is a schematic structural diagram of an apparatus according to an embodiment of the disclosure.

Another apparatus for presenting an afterimage is further provided according to an embodiment of the disclosure. As shown in FIG. 12, the apparatus includes a receiver 1201, a transmitter 1202, a processor 1203 and a storage 1204. The storage 1204 may be applied as a cache for caching data processed by the processor 1203 or for storing a processing result.

The processor 1204 is configured to: determine an target object, an afterimage of which is to be presented; obtain a motion track of the target object; replicate the target object to obtain the preset number of replicated objects; arrange the target object and the replicated objects according to the motion track of the target object; set transparencies of the replicated objects, wherein a transparency of a replicated object spaced from the target object by a first distance is larger than a transparency of a replicated object spaced from the target object by a second distance, and the first distance is greater than the second distance; and display the target object and the replicated objects on the display device with the set transparencies.

In the embodiment of the disclosure, the target object may be any image element needed to present an afterimage effect, for example, a movable image element such as a character role or an object in an animation. Generally, a static object, for example, a background image, a flower, a grass, a tree and a stone on a map and so on, does not need to present the afterimage.

In the embodiment, the number of replicated objects may be determined according to a requirement. Generally, the number of replicated objects is larger than or equal to two. The afterimage effect is poor in a situation of only one replicated object. A moving image element has a motion track. The motion track may include information such as a moving direction and a state of an object itself. For example, a linear or curvilinear motion of an image element may have a path that a motion passes through; and a rotation of an image element may change a state of a visual angle of the image element. Besides, a distance between the replicated object and the target object may be a spatial distance or a time distance. In a linear motion, the first and second distances may be the spatial distance. If each of the first and second distances is the time distance, the time distance may be a difference between time corresponding to the replicated object in a motion track and a time corresponding to the target object. Instead of the time corresponding to the target object, any other time after time corresponding to the first replicated object may be used as a reference, which is not limited in the embodiment of the disclosure.

In the embodiment, the afterimage may be presented after the target object and the replicated objects are displayed. The above process for presenting the afterimage only needs to replicate the image element for generating the afterimage effect, arrange the images and set the transparencies. Thus, the whole image frame does not need to be stored in a rendering buffer and the transparency blending process does not need to be performed on the whole image frame. In this way, a data processing resource and a storage resource for implementing the afterimage effect can be reduced, a requirement of hardware is lowered, and a device with a low hardware performance also can obtain the smooth visual effect.

In an embodiment of the disclosure, a method for presenting an afterimage may be applied in any application scenario needing to present the afterimage such as a video and a game which are appeared by displaying images. For a three-dimensional picture, a preferable implementation is provided according to an embodiment of the disclosure. In particular, the above target object is a 3D target object. The processor 1204 is configured to replicate a grid of the target object to obtain the preset number of grids of the replicated objects and determine that the grids of the replicated objects have the same material as the grid of the target object.

In the embodiment, for a 3D image element, only the grid is replicated. There is no need to replicate all information of the image element, and thus an amount of replicated data and a space to be occupied are reduced. A grid in a 3D rendering represents a profile of a 3D object, i.e., a profile of the image element. A material in a 3D rendering represents surface information of a 3D object, includes a color, a pattern and so on. The material is attached on a surface of the grid, to make the grid present a real effect of the 3D object.

Based on the embodiment of the disclosure applying in a 3D application scenario, a preferable implementation for setting a transparency is further provided according to an embodiment of the disclosure as follows. The processor 1204 is configured to adjust transparencies of vertexes in the respective grids of replicated objects.

In the embodiment, the motion track of the target object may be obtained by many manners and then the replicated objects are arranged. A preferable solution is provided according to an embodiment of the disclosure as follows. The processor 1204 is configured to record motion information of the target object at a preset time interval and arrange the replicated objects corresponding to positions of the recoded motion information successively.

In the embodiment, instead of a motion track of the target object, only the motion information of the target object needs to be obtained to determine information such as a position and an angle of each replicated object, so to efficiently implement a position and an angle of the afterimage. The preset time interval may be a fixed value or a variable value changing with a control parameter. For example, the faster a moving speed is, the larger the distance between afterimages is. However, a large distance may lower an effect of the afterimage. Thus, in the case of a fast moving speed, a time interval between the replicated objects may be shortened. Criteria shortening the time interval may be set as making a distance between two adjacent replicated objects less than a preset value. The preset value may be set according to a size of the target object. The bigger the size of the target object is, the larger the preset value is.

Optionally, in the embodiment, the motion information may only include position information. In another embodiment, for many rotating objects, the motion information may include rotation information. A position change and an angle change caused by rotating are all caused by moving, and thus they are all called motion information. In particular, the motion information may include at least one of the rotation information and the position information.

Furthermore, an acceleration and deceleration of the moving speed of an object may be shown by adding or reducing a number of the replicated objects as follows. The processor 1204 is further configured to determine a moving speed of the target object, before the target object is replicated to obtain the preset number of replicated objects and to determine the replicating number of the target object according to the moving speed. The replicating number of the target object in the case of the fast moving speed is more than the replicating number of the target object in the case of the low moving speed.

Based on an embodiment of the disclosure, a game image display implemented at a terminal is used as an application scenario. In particular, the processor 1204 is further configured to determine an object currently operated by a user in an image displayed on a display device of the terminal, as the target object. The object operated by the user may be a character object in a 2D game picture or a character object in a 3D game picture. A particular type of a game is determined according to a client device on which the afterimage is to be presented.

Figure 13:
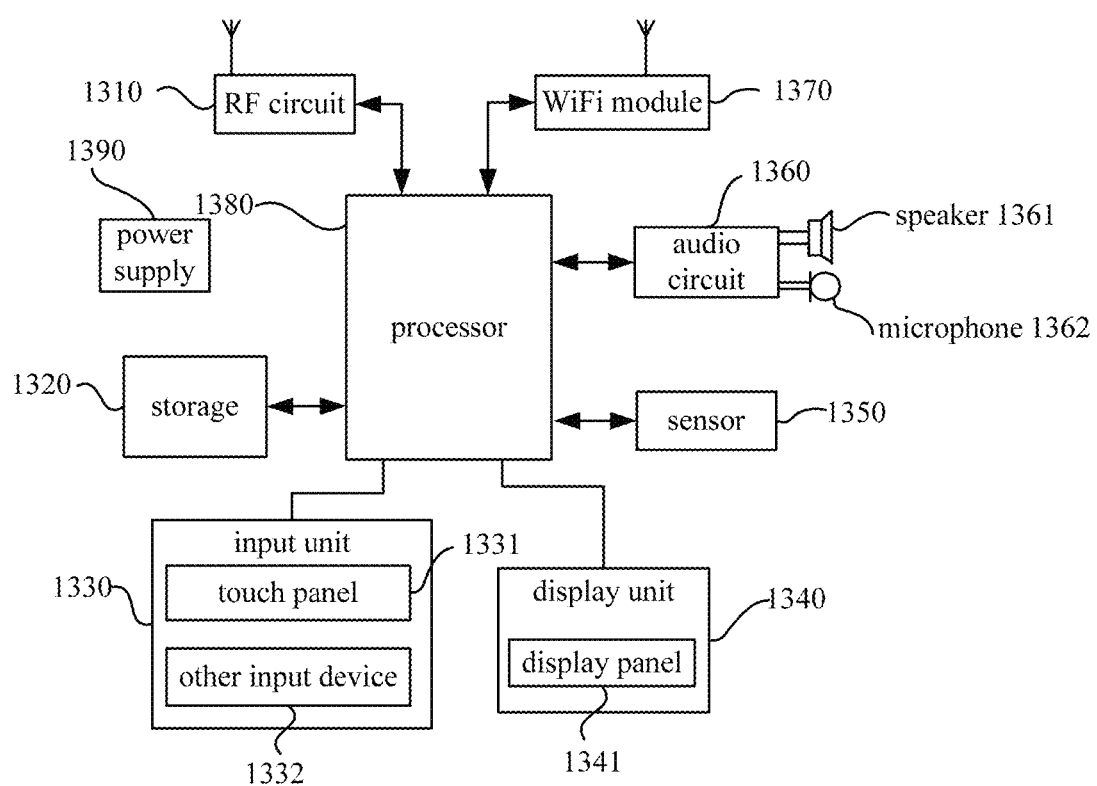
FIG. 13 is a schematic structural diagram of a mobile phone according to an embodiment of the disclosure.

Another apparatus for presenting an afterimage is further provided according to an embodiment of the disclosure. As shown in FIG. 13, only parts relating to the embodiment of the disclosure are shown for convenient illustration. A specific technical detail is not disclosed, which is referred to the method according to the embodiment of the disclosure. The apparatus may include any terminal device such as a mobile phone, a tablet, a PDA (Personal Digital Assistant), a POS (Point of Sales) and an on-board computer. A mobile phone is taken as an example.

FIG. 13 is a block view of part structures of a mobile phone relating to a terminal according to an embodiment of the disclosure. Referring to FIG. 13, the mobile phone includes components such as a radio frequency (RF) circuit 1310, a storage 1320, an input unit 1330, a display unit 1340, a sensor 1350, an audio circuit 1360, a wireless fidelity (WiFi) module 1370, a processor 1380 and a power supply 1390. The mobile phone structure is not limited to the mobile phone in FIG. 13, which may include more or less components as shown in FIG. 13, combine some other components, or arrange different components.

Hereinafter each constituent components of the mobile phone are specifically illustrated in conjunction with FIG. 13.

The RF circuit 1310 may be configured to receive and send a signal in a process of sending and receiving information or communicating. In particular the RF circuit 1310 receives downlink information and sends the received information to the processor 1380 to process them. Besides, the RF circuit 1310 sends designing uplink information to the base station. Generally, the RF circuit 1310 includes and is not limited to an antenna, at least an amplifier, a transceiver, a coupler, a low noise amplifier (LNA) and a duplexer. In addition, the RF circuit 1310 may communicate with other device by a wireless communication and network. The wireless communication may utilize any communication standard or protocol including and not being limited to the Global System of Mobile communication (GSM), the General Packet Radio Service (GPRS), the Code Division Multiple Access (CDMA), the Wideband Code Division Multiple Access (WCDMA), the Long Term Evolution (LTE), an email, the Short Messaging Service (SMS) and so on.

The storage 1320 stores software programs and modules. The processor 1380 executes the software programs and the modules stored in the storage 1320 to perform various function applications of the mobile phone and data processes. The storage 1320 may mainly include a program storing area and a data storing area. The program storing area may store an operation system, and an application for implementing at least one function (such an audio playing function, an image playing function) and so on. The data storing area may store data established in a usage of the mobile phone. In addition, the storage 1320 may include a high-speed random access memory or a nonvolatile memory, such as at least one disk storage device, a flash and other volatile solid state memory device.

The input unit 1330 receives inputted number or character information, and generates a key signal input related to a user setting and a function control of the mobile phone. In particular, the input unit 1330 may include a touch panel 1331 and other input device 1332. The touch panel 1331 is also called a touch screen, which can collect a touch operation of a user on or near it (for example an operation operated on or near the touch control panel 1331 by a user using any suitable object or attachment such as a finger or a touch pen), and drive a connect device based on a preset program. Optionally, the touch panel 1331 may include a touch detecting apparatus and a touch controller these two parts. The touch detecting apparatus detects a touch position of a user and a signal brought by a touch operation, and sends the signal to the touch controller. The touch controller receives touch information from the touch detecting apparatus, converts the touch information to a coordinates of the touch point and then sends the coordinates to the processor 1380, and receives and executes a command send by the processor 1380. In addition, the touch panel 1331 may be implemented in any type as a resistance type, a capacitance type, infrared or surface acoustic wave. Besides the touch panel 1331, the input unit 1330 may further include other input device 1332. In particular, the other input device 1332 may include, but not be limited to, one or more of a physical keyboard, a function key (such as an audio volume control key, a switch key and so on), a track ball, a mouse and a joystick.

The display unit 1340 may display information inputted by the user or provided to the user, and various menus of the mobile phone. The display unit 1340 may include a display panel 1341. Optionally, the display unit 1340 may be configured by many forms such as a liquid crystal display (LCD), an organic light-emitting diode (OLED) and so on. Furthermore, the touch panel 1331 may cover the display panel 1341. When detects a touch operation on or near the touch panel 1331, the touch panel 1331 sends the operation to the processor 1380 to determine a type of the touch event. Then, the processor 1380 provides a corresponding visual input on the display panel 1341 according to the type of the touch event. In FIG. 13, the touch panel 1331 and the display panel 1341 implement an input function and an output function as two separate components. However, in some embodiments, the touch panel 1331 and the display panel 1341 may be integrated to implement the input and output function.

The mobile phone may further include at least one type of sensor 1350 such as an optical sensor, a motion sensor and other sensor. In particular, the optical sensor may include an ambient light sensor and a proximity sensor. The ambient light sensor can adjust a brightness of the display panel 1341 according to a brightness of ambient light. The proximity sensor switches off the display panel 1341 and/or a backlight when the mobile phone moves to an ear. As one type of a motion sensor, an acceleration sensor can detect a value of an acceleration in all directions (general three axes), can detect a value and a direction of a gravity in a static state, and can be utilized by an application identifying a mobile phone gesture (for example a switch between a landscape mode and a portrait mode, games related to the gesture and a gesture calibration using a magnetometer), a related function for identifying a vibration (for example a pedometer, a knock) and so on. Other sensor, which may be configured in a mobile phone, may further include such as a gyroscope, a barometer, a hygrometer, a thermometer and an infrared sensor, which is not described herein.

The audio circuit 1360, a speaker 1361 and a microphone 1362 may provide an audio interface between a user and the mobile phone. The audio circuit 1360 may send an electric signal converted from received audio data to the speaker 1361. Then the speaker 1361 converts the electric signal to an audio signal and outputs. On the other hand, the microphone 1362 converts a received audio signal to an electric signal. The audio circuit 1360 receives the electric signal and converts them to the audio data. Then audio data is outputted to the processor 1380 to process, and the RF circuit 1310 sends the processed audio data to the other mobile phone. Alternatively, the audio data is outputted to the storage 1320 for further process.

WiFi is a short distance wireless transmission technology. A mobile phone can receive and send an electric email, browse a webpage and access streaming media via the WiFi module 1370. The WiFi module 1370 provides a user with a wireless broadband internet access. The WiFi module 1370 shown in FIG. 13 is not a necessary component of the mobile phone, which may be completely omitted according to a requirement without changing an essence of the disclosure.

The processor 1380 is a control center of the mobile phone, which communicates with each parts of the mobile phone by utilizing various interfaces and lines and executes various functions of the mobile phone and processes data by running or executing a software program and/or modules stored in the storage 1320 and calling data stored in the storage 1320, so as to entirely monitor the mobile phone. Optionally, the processor 1380 may include one or more processing unit. Preferably, an application processor and a modem may be integrated to the processor 1380. Then application processor mainly processes the operation system, a user interface, an application system and so on. The modem mainly processes a wireless communication. Actually, the modem may not be integrated in the processor 1380.

The mobile phone further includes the power supply 1390 (for example a battery) for supplying a power to each component. Preferably, the power supply may communicate with the processor 1380 via a power supply management system. Thus, manage functions such as charge, discharge and power management may be performed via the power supply management system.

Although it is not shown, the mobile phone further includes a camera, a Bluetooth module and so on, which will not be described herein.

In the embodiment of the disclosure, the processor 1380 included in the terminal may be configured to execute each step in the method embodiment.

It should be noted that in the above apparatus according to an embodiment, each unit included is divided according to function logic. The dividing method is not limited to the above. A division which can implement a corresponding function is fall into the scope of the application. In addition, a specific name of each function unit is for convenient distinguishing, not for limiting a protective scope of the disclosure.

Besides, those skilled in the arts may understand that implementing all or part of the steps of each method embodiment may be implemented by a program instructing a corresponding hardware. The corresponding program may be stored in a computer readable storage medium. The above mentioned storage medium may be a read-only memory, disk or CD and so on.

The above are only some embodiments of the disclosure, but the protective scope of the disclosure is not limited. Modifications and replacements within the knowledge of one skilled in the art all fall in the protective scope of the disclosure. Thus, the protective scope of the disclosure is defined by the claims.

The invention claimed is:

1. A method for presenting an afterimage, applied to a terminal comprising a display device, comprising:
   determining a target object, wherein the target object is a movable image element in an image frame comprised of a plurality of movable image elements and a plurality of static image elements;
   obtaining a motion track of the target object;
   replicating the target object to obtain a preset number of replicated objects;
   arranging, according to the motion track of the target object, the target object and the replicated objects;
   setting transparencies of the replicated objects, wherein a transparency of a replicated object spaced from the target object by a first distance is larger than a transparency of a replicated object spaced from the target object by a second distance; and
   displaying, on the display device, the target object and the replicated objects with the set transparencies,
   wherein the method is performed under control of a processor.

2. The method according to claim 1, wherein the target object is a three dimensional (3D) target object, and replicating the target object to obtain the preset number of replicated objects comprises:
   replicating a grid of the target object to obtain the preset number of grids of the replicated objects; and
   determining that the grids of the replicated objects have the same material as the grid of the target object.

3. The method according to claim 2, wherein setting transparencies of the replicated objects comprises:
   adjusting transparencies of vertexes in the respective grids corresponding to the replicated objects.

4. The method according to claim 1, wherein obtaining a motion track of the target object comprises:
   recording motion information of the target object at a preset time interval; and arranging, according to the motion track of the target object, the target object and the replicated objects comprises: arranging the replicated objects to positions corresponding to the recoded motion information successively.

5. The method according to claim 4, wherein before replicating the target object to obtain the preset number of replicated objects, the method further comprises:
determining a moving speed of the target object; and
determining the replicating number of the target object according to the moving speed;
wherein replicating number of the target object in the case of a first moving speed is more than the replicating number of the target object in the case of a second moving speed, and wherein the first moving speed is faster than the second moving speed.

6. The method according to claim 1, wherein the first distance is greater than the second distance.

7. The method according to claim 1, wherein determining a target object comprises:
determining an object currently operated by a user in an image displayed on the display device of the terminal as the target object.

8. An apparatus for presenting an afterimage comprising a display device, a processor and a non-transitory memory for storing program instructions that, when executed by the processor, cause the processor to:
determine a target object, wherein the target object is movable image element in an image frame comprises of a plurality of movable image elements and a plurality of static image elements;
obtain a motion track of the target object;
replicate the target object to obtain the preset number of replicated objects;
arrange, according to the motion track of the target object, the target object and the replicated objects;
set transparencies of the replicated objects, wherein a transparency of a replicated object spaced from the target object by a first distance is larger than a transparency of a replicated object spaced from the target object by a second distance; and
display, on the display device, the arranged target object and the replicated objects with the set transparencies.

9. The apparatus according to claim 8, wherein the target object is a three dimensional target object; and the program instructions, when executed by the processor, cause the processor further to:
replicate a grid of the target object to obtain a preset number of grids of the replicated objects and determine that the grids of the replicated objects have the same material as the grid of the target object.

10. The apparatus according to claim 9, wherein the program instructions, when being executed by the processor, cause the processor further to:
adjust transparencies of vertexes in the respective grids of the replicated objects.

11. The apparatus according to claim 8, wherein the program instructions, when executed by the processor, cause the processor further to:
record motion information of the target object at a preset time interval and arrange the replicated objects to positions corresponding to the recoded motion information successively.

12. The apparatus according to claim 11, wherein the program instructions, when being executed by the processor, cause the processor further to:
determine a moving speed of the target object;

determine the replicating number of the target object according to the moving speed, wherein the replicating number of the target object in the case of a first moving speed is more than the replicating number of the target object in the case of a second moving speed, and wherein the first moving speed is faster than the second moving speed.

13. The apparatus according to claim 8, wherein the first distance is greater than the second distance.

14. The apparatus according to claim 8, wherein the program instructions, when being executed by the processor, cause the processor further to:
determine an object currently operated by a user in an image displayed on the display device of the terminal as the target object.

15. A non-transitory computer readable medium storing instructions that, when executed by a processor, cause the processor to:
determine a target object, wherein the target object is a movable image element in an image frame comprised of a plurality of movable image elements and a plurality of static image elements;
obtain motion track of the target object;
replicate the target object to obtain the preset number of replicated objects;
arrange, according to the motion track of the target object, the target object and the replicated objects;
set transparencies of the replicated objects, wherein a transparency of a replicated object spaced from the target object by a first distance is larger than a transparency of a replicated object spaced from the target object by a second distance; and
display, on the display device, the target object and the replicated objects with the set transparencies.

16. The non-transitory computer readable medium according to claim 15, wherein the target object is a three dimensional target object; and the instructions further cause the processor to:
replicate a grid of the target object to obtain the preset number of grids of the replicated objects;
determine that the grids of the replicated objects have the same material as the grid of the target object; and
adjust transparencies of vertexes in the respective grids corresponding to the replicated objects.

17. The non-transitory computer readable medium according to claim 15, wherein the instructions further cause the processor to:
record motion information of the target object at a preset time interval; and
arrange the replicated objects to positions corresponding to the recoded motion information successively.

18. The non-transitory computer readable medium according to claim 17, wherein the instructions further cause the processor to:
determine a moving speed of the target object; and
determine the replicating number of the target object according to the moving speed;
wherein the replicating number of the target object in the case of a first moving speed is more than the replicating number of the target object in the case of a second moving speed, and wherein the first moving speed is faster than the second moving speed.

19. The non-transitory computer readable medium according to claim 15, wherein the first distance is greater than the second distance.

20. The non-transitory computer readable medium according to claim 15, wherein the instructions cause the processor to: determine an object currently operated by a user in an image displayed on the display device of the terminal as the target object.

* * * * *